(12) United States Patent
Scalzi

(10) Patent No.: US 7,215,037 B2
(45) Date of Patent: May 8, 2007

(54) PROTECTIVE WIND ENERGY CONVERSION CHAMBER

(76) Inventor: Saverio Scalzi, 4801 Buchanan St., Hollywood, FL (US) 33021

( * ) Notice: Subject to any disclaimer, the term of this patent is extended or adjusted under 35 U.S.C. 154(b) by 52 days.

(21) Appl. No.: 10/993,102

(22) Filed: Nov. 19, 2004

(65) Prior Publication Data
US 2006/0108809 A1    May 25, 2006

(51) Int. Cl.
  F03D 9/00    (2006.01)
  H02P 9/04    (2006.01)

(52) U.S. Cl. .......................................... 290/55; 290/44

(58) Field of Classification Search ................. 290/44, 290/55, 54; 417/7; 415/2.1, 4.2, 4.3, 907; 415/905, 908, 4.5, 7, 4.1
See application file for complete search history.

(56) References Cited

U.S. PATENT DOCUMENTS

| | | | |
|---|---|---|---|
| 264,164 A * | 9/1882 | Jackson | 415/2.1 |
| 1,027,501 A | 5/1912 | Pearson | |
| 1,345,022 A * | 6/1920 | Oliver | 415/4.3 |
| 3,740,565 A | 6/1973 | Wesley | |
| 3,832,853 A | 9/1974 | Butler, Jr. | |
| 4,057,270 A * | 11/1977 | Lebost | 290/54 |
| 4,070,131 A | 1/1978 | Yen | |
| 4,087,196 A * | 5/1978 | Kronmiller | 415/4.5 |
| 4,191,505 A * | 3/1980 | Kaufman | 415/2.1 |
| 4,199,974 A | 4/1980 | Fryberger et al. | |
| 4,224,527 A | 9/1980 | Thompson | |
| 4,236,083 A | 11/1980 | Kenney | |
| 4,278,896 A * | 7/1981 | McFarland | 290/55 |
| 4,316,704 A | 2/1982 | Heidt | |
| 4,321,005 A | 3/1982 | Black | |
| 4,457,666 A | 7/1984 | Selman, Jr. | |
| 4,516,907 A * | 5/1985 | Edwards | 415/4.5 |
| 4,582,013 A | 4/1986 | Holland, Jr. | |
| 4,616,974 A | 10/1986 | Andruszkiw et al. | |
| 4,935,639 A | 6/1990 | Yeh | |
| 5,332,925 A | 7/1994 | Thomas | |
| 5,391,926 A | 2/1995 | Staley et al. | |
| 5,394,016 A | 2/1995 | Hickey | |
| 5,553,996 A | 9/1996 | Farrar | |
| 6,016,015 A | 1/2000 | Willard, Jr. | |
| 6,126,385 A | 10/2000 | Lamont | |

(Continued)

OTHER PUBLICATIONS

Provda, Alex D.: "Optimal Windmill Blades for Power Generation", California State Science Fair, Project Summery, 2002, 1 page.

Primary Examiner—Julio Cesar Gonzalez
(74) Attorney, Agent, or Firm—Laurence A. Greenberg; Werner H. Stemer; Ralph E. Locher

(57) ABSTRACT

A protective wind energy conversion chamber provides a protected multiple turbine mechanism axially aligned to convert kinetic energy of a moving fluid (e.g., wind) into rotational mechanical power by the reaction of the moving fluid with the turbine. The conversion chamber may either be configured as a vertical axis wind turbine (VAWT) or horizontal axis wind turbine (HAWT). The conversion chamber repositions an intake windward to collect and concentrate the wind prior to converting the wind into energy via the axially aligned multi-turbine mechanism. The remaining wind is released via a leeward-facing exhaust. Completely enclosed by the protective wind energy conversion chamber, the axially aligned multi-turbine mechanism avoids interference by birds and other outside objects.

37 Claims, 14 Drawing Sheets

U.S. PATENT DOCUMENTS

| | | | |
|---|---|---|---|
| 6,132,172 A * | 10/2000 | Li .................................. | 416/11 |
| 6,246,126 B1 | 6/2001 | Van Der Veken et al. | |
| 6,270,308 B1 * | 8/2001 | Groppel ........................ | 415/4.3 |
| 6,448,668 B1 | 9/2002 | Robitaille | |
| 6,465,902 B1 | 10/2002 | Beauchamp et al. | |
| 6,538,340 B2 | 3/2003 | Elder | |
| 6,548,913 B2 | 4/2003 | Jang | |
| 6,608,397 B2 | 8/2003 | Makino et al. | |
| 6,674,181 B2 * | 1/2004 | Harbison ...................... | 290/55 |
| 6,841,894 B2 | 1/2005 | Gomez Gomar | |
| 6,981,839 B2 * | 1/2006 | Fan ............................... | 415/4.1 |
| 7,056,082 B1 * | 6/2006 | Taylor ......................... | 415/4.2 |
| 2003/0122379 A1 | 7/2003 | Woods | |

\* cited by examiner

PROTECTIVE WIND ENERGY CONVERSION CHAMBER

FIELD OF THE INVENTION

The present invention relates to wind energy conversion chambers. More particularly, the present invention relates to wind turbines used to generate electricity or drive other engines.

BACKGROUND AND RELATED ART

Energy needs of our society continue to grow at an increasing rate. Unfortunately, much of this energy is supplied by nonrenewable resources whose relative availability continues to decrease. Members of the power generation industry are gradually developing more efficient methods of power generation, with the ambition of one day generating their electricity from clean, sustainable renewable resources.

One such potential area for expansion is wind energy. Wind turbines of various sizes and designs can mitigate our dependence on foreign energy supplies while providing distinct benefits to our domestic economy. Wind turbine designs may be optimized for particular locations and conditions. Moreover, wind turbines use the wind, a clean, nonpolluting energy source.

The United States has tremendous wind energy resources. In California, wind farms currently replace almost 4 million barrels of oil per year. At least sixteen states have even greater wind potential than California based on measured average wind rates.

The installed wind energy generating capacity in the U.S. is currently estimated to be around 6,400 MW, and is expected to generate about 16.7 billion kWh of electricity in 2004, which is less than about 1% of the total U.S. electricity generation. By contrast, the total amount of electricity that could potentially be generated from wind in the United States has been estimated at about 11,000 billion kWh annually, over three times the electricity generated in the U.S. today.

Existing wind farms help demonstrate how wind energy can help meet growing needs for affordable, reliable power. Moreover, with continued government encouragement through, among other things, heightened technology transfer from national laboratories to the wind energy industry, wind energy is slated to become more economical than traditional fossil-fueled energy. Some estimate that wind related energy sources could provide at least six percent of the nation's electricity by 2020. More importantly, the wind generator could help revitalize farms and rural communities without consuming any natural resource or emitting any pollution or greenhouse gases.

Wind turbines have traditionally been built using a turbine attached to a horizontal axis suspended high above the ground. Wind turbines have been used for centuries to capture the power of the wind to mill grain into flour or pump water. More recently, as previously indicated, wind generators; such as a wind turbine configured to produce electricity, have also been used to supplement the electrical energy supply.

Unfortunately, while the electricity generated by wind turbines use a clean, nonpolluting energy source, traditional wind turbine systems have a somewhat unexpected negative effect on the wildlife in the immediate environment, particularly on the local avian population.

Specifically, some wind turbine systems are configured to maintain such a fast rotation that the blades become almost invisible. The wind turbines must have sharp blades that efficiently cut through the wind. Moreover, the same sharp blades are often positioned high in the air at the top of a wind tower. As the wind towers are typically the tallest structures in the area, they become a natural perch for raptors and other birds. A deadly combination when coupled with the virtual invisibility of the sharp rotating blades, which are also very good at slicing through eagles and other birds. For example, the Center for Biological Diversity reports that the approximately 5,400 turbines located around Altamont Pass in California kill more than an estimated 800 birds a year, including several species protected by federal and state laws.

Even the officially documented avian collision and electrocution incidents reported from 1985 to 1988 at various California wind energy facilities tend to support the contention that the wind generators are more dangerous to the larger birds. For example, of the 147 reported incidents during the period from 1985 to 1988, 101 were raptors, of which 34 were eagles and 58 were hawks. Some estimate that in the Altamont Pass Wind Resource Area, an average of 11 eagle and 17 hawk incidents occurred annually. Unfortunately, ninety-one percent of all documented avian incidents eventually resulted in mortality for the bird. This high mortality rate and incident information helps identify the need to better understand and resolve the biological effects of wind projects on the surrounding environment.

As such, there is clearly a need for a more environmentally friendly and efficient wind based power device. Unfortunately, none of the currently available systems can provide environmental protection for the surrounding avian population.

SUMMARY OF THE INVENTION

A wind energy conversion method, system, and apparatus have been developed in response to the current state of the art, and in particular, in response to these and other problems and needs that have not been fully or completely solved by currently available wind energy conversion systems. More specifically, the wind conversion chamber allows for safe conversion of energy from a moving gas stream, such as a gust of wind or air current. In fact, the described wind energy conversion system may even be safely deployed in high density area, such as cities.

In accordance with one aspect of the present invention there is provided a device for converting wind energy with improved efficiency and environmental safety. In addition to the generation of energy, the described wind energy conversion chamber may provide protection for people and animals interacting with the wind conversion chamber.

While the wind energy conversion chamber is designed to be an efficient component of a wind farm, the protective design that encloses the moving parts also allows deployment in cities and along shorelines. In one embodiment, a rotatable turret forms the basis of the wind chamber. Alternatively, in areas where the wind flows from a dominate direction; the protectively covered intake may be fixed in the windward direction, which is substantially perpendicular to the regular flow of the ambient wind currents. One particular use of this embodiment is on top of a building, in a canyon, along a coastline, or atop a mountain ridge.

Adjusting the size of the wind energy conversion chamber enables use of various embodiments in conjunction with various moving vehicles to produce supplemental electricity. For example one embodiment collects and converts wind for various nautical vessels from large ships to small boats. This is particularly useful in recharging sailing batteries for later use when the wind is unavailable. Another embodiment provides energy in other vehicles, such as a car, bus, train, truck, or airplane via a venting system.

It is accordingly an object of the invention to provide energy using a method, system, and apparatus that overcomes the hereinabove-mentioned disadvantages of the heretofore-known devices of this general type and that provide wind generation.

With the foregoing and other objects in view, there is provided, in accordance with the invention, a method including the steps of positioning a protective covered intake to receive the wind, collecting the wind into multiple conduits, concentrating the wind within the conduits, converting the wind into energy, and directing the concentrated wind gust to a protective covered exhaust.

In accordance with another mode of the invention, the step of collecting the wind further partitions the wind into substantially equal portions.

In accordance with a further mode of the invention, there is provided the step of positioning that includes rotating about a yaw axis the protectively covered intake to obtain an optimum flow of the ambient wind current.

In accordance with an added mode of the invention, there is provided the step of determining whether the step of conversion is within operating thresholds.

In accordance with an additional mode of the invention, there is provided the step of repositioning the intake for optimal flow upon determining that the wind generator is operating outside of the operating thresholds.

In accordance with yet an added mode of the invention, each channel is divided into substantially equal concentrator conduits to direct and to separate the wind for a different turbine.

With the objects of the invention in view, there is also provided a system for wind energy conversion, the system including a wind chamber with a revolving or rotatable intake and exhaust, a converter, protective screens, and a turbine.

In accordance with one embodiment of the invention, the converter includes a unidirectional rotating shaft coupled to turbines within the converter. The rotating shaft is powered by rotational mechanical power generated by the rotating turbines. In an additional embodiment, the rotating shaft includes a plurality of telescoping shafts each coupled to one turbine.

In an alternative embodiment, the shaft is fixed and merely used as a support mechanism for the turbines and converters. The turbines rotate about the shaft and are individually coupled to at least one converter that changes the rotational mechanical power of the turbines to energy.

Other features that are considered as characteristic for the invention are set forth in the appended claims.

Although the invention is illustrated and described herein as embodied in a protective wind energy conversion chamber method, system, and apparatus, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

Additional features and advantages of the protective wind energy conversion chamber will be set forth in the description that follows, and in part will be obvious from the description, or may be learned by the practice of protected wind energy conversion. The features and advantages of the protective wind energy conversion chamber may also be realized and obtained by the instruments and combinations particularly pointed out in the appended claims.

BRIEF DESCRIPTION OF THE DRAWINGS

The embodiments of the invention are illustrated by way of example, and not by way of limitation, in the figures of the accompanying drawings in which like reference numerals refer to similar elements. In the drawings.

DETAILED DESCRIPTION

In the following description, numerous specific details are set forth. However, it is understood that embodiments of the invention may be practiced without these specific details. In other instances, well-known hardware, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
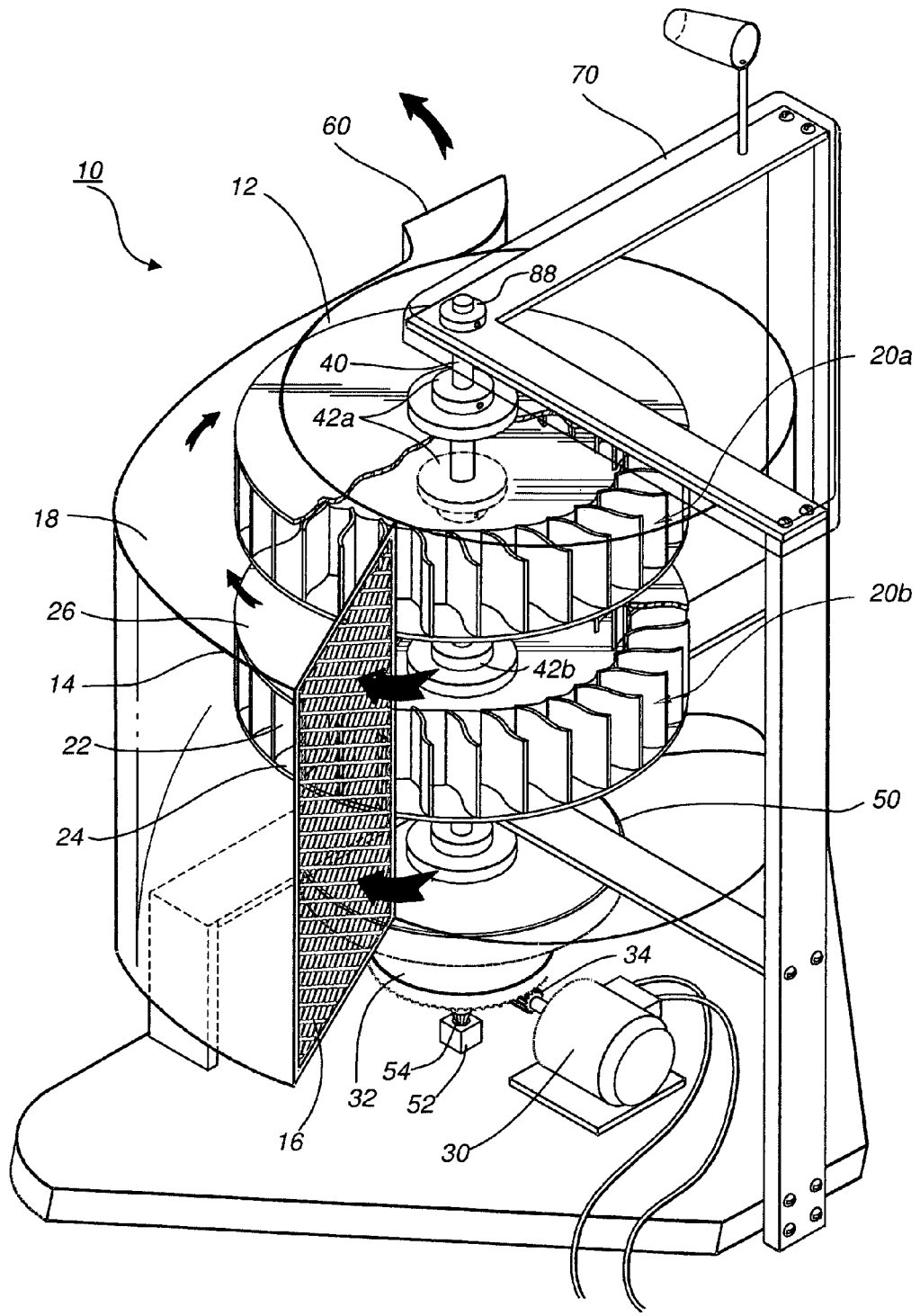
FIG. 1 is a fragmentary perspective and partially broken away front view from above of the Wind Energy Conversion Chamber according to the present invention.

FIG. 1 and the following discussion are intended to provide a brief, general description of a suitable operating environment or wind energy conversion system 10. A wind turbine or wind energy conversion system 10 is a machine or mechanism that captures the force of the wind and converts the force to another form of energy. In one configuration, the wind energy conversion system 10 is configured as a wind generator, a type of wind turbine system specifically configured to produce electricity. Other configurations may produce mechanical energy. The illustrated system 10 includes multiple turbines 20, at least one generator 30, a shaft 40, a flywheel 50, exhaust 60, and a support structure 70.

Figure 3:
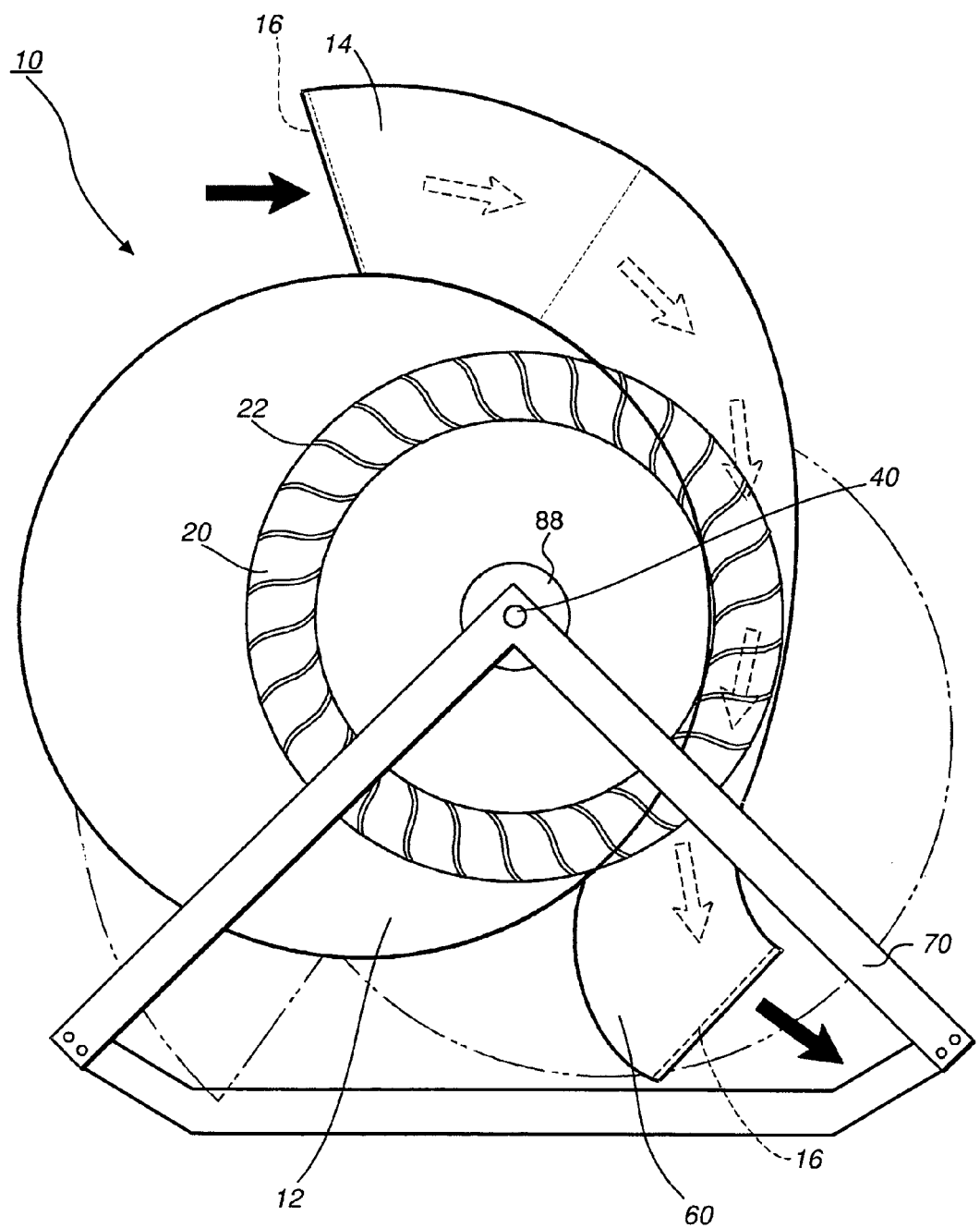
FIG. 3 is a plan view from above of an embodiment of a suitable operating environment for a Wind Energy Conversion Chamber system according to the present invention.

The support structure 70 concentrically positions the rotating shaft 40 about a yaw axis without interfering with the rotation of the housing 12 (FIG. 3). In the embodiment illustrated in FIG. 1, the shaft 40 also rotates about the yaw axis. Multiple turbines 20, at least one mechanical energy transfer mechanism (gear 32), and a flywheel 50 are coupled to the rotating shaft 40. The flywheel 50 operates to maintain a substantially consistent revolutionary speed, much like a capacitor helps maintain a voltage or an inductor helps maintain a current in electrical circuits.

Figure 2:
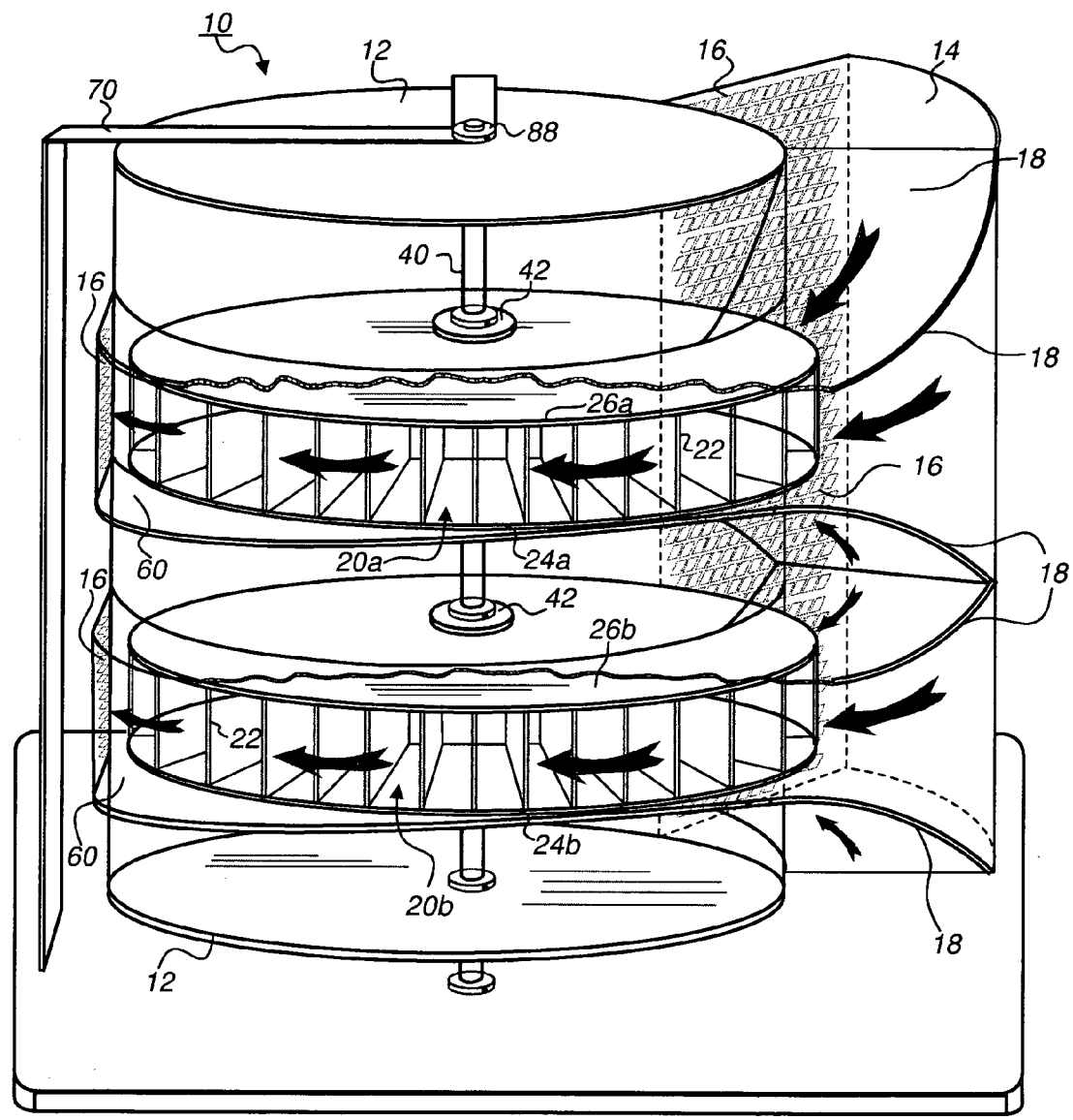
FIG. 2 is a fragmentary perspective and partially broken away back view from above of an embodiment of a Wind Energy Conversion Chamber according to the present invention.

As previously indicated, one embodiment of the system 10 includes a rotating or revolving chamber or housing 12 having an intake 14 with a protective screen 16 that may be rotated to a windward direction about a common axis of the turbines 20. Following readjustment of the revolving housing 12, the intake 14 is preferably positioned windward in a substantially perpendicular or normal position to the detected flow of available wind current. The intake 14 is configured to collect wind and direct the collected wind into a concentrating channel 18 (FIG. 2). The illustrated concentrating channel 18 includes multiple conduits, each conduit having an inlet and an outlet. The system 10 also includes multiple turbines 20a and 20b, with each turbine partially intruding into a respective one of the multiple conduits.

A turbine 20 as used herein includes any mechanism in which kinetic energy of a moving fluid (e.g., wind) is converted to mechanical power by the impulse or reaction of the fluid with the turbine 20. For example, upon receiving a gust of ambient wind current impinging on the blades 22 of a turbine 20, the turbine 20 turns about an axis or shaft 40 positioned substantially normal (vertical or horizontal) to the ambient wind current. The illustrated embodiment of the turbine 20 also includes a bottom turbine plate 24 and top turbine plate 26 to help contain the wind within the conduit and to increase efficiency of the wind conversion by reducing the degree of vorticity or turbulent flow present around the turbine in the conduit. In one embodiment, the turbine 20 includes blades 22 arrayed about the circumference of a wheel or cylinder. The wheel or cylinder about the hub of the turbine helps to seal the compression chamber and limit the wind movement outside of the conduit. The cylinder is configured to further constrain the wind within the conduit and focus the wind energy on pushing the blades 22. Exemplary blades 22 include a series of fins, paddles, cups, blades, wings, or the like. These blades may be customized for their application. For example, the blades may be designed with a double curve structure to quickly reach cut-in, the rotational speed at which an alternator or generator starts pushing electricity hard enough or has a high enough voltage to make electricity flow in a circuit. The double curve blade design may also enable the blade of the turbine to maintain effective operation at high winds.

Normally, the term "rotor" is used to describe both the blades 22 and hub assembly 42 of a wind generator and the armature of a permanent magnet alternator, however, to reduce potential confusion, the term turbine 20, previously defined above, is substituted herein for "rotor" when referring to both the blade 22 and hub assembly 42 of a wind generator.

The hub 42 is the center of a turbine 20 and may include a thrust bearing to help transfer the force of the wind onto the turbines 20. In one embodiment, the hub 42 is configured to enable rotation of the turbine 20 in a single direction. An embodiment, with a rotating shaft 40, allows rotation of each turbine 20 to potentially contribute a moment force, or torque, to shaft 40 with respect to the yaw axis that goes through the center of the turbines 20 via the hubs 42.

The hub 42 also positions the blades 22 in place and attaches the turbine 20 to a shaft 40. The blades 22 are the portions of the turbine 20 that catch the wind. Some turbines 20 are designed such that their rotations are stall controlled by the placement of the blades 22. In one embodiment, the blades 22 are dynamically positioned or the size of the blade chord changed according to the needs of the system 10. A blade chord (see FIG. 2 and FIG. 4) is the width of a wind turbine blade 22 at a given location along the length. The hub 42 is generally coupled to a shaft via a thrust bearing designed to withstand the axial forces of the wind pushing against the turbine along a centerline of the blade chord with respect to the shaft 40.

In addition to the wind generator rotor previously described, an embodiment of the system 10 includes a generator 30 with a variable magnetic armature or rotor 34 electromagnetically coupled with a variable stator. The variable stator and variable armature/rotor 34 may fluctuate according to the rotational speed of the shaft 40 to optimize the amount of electricity that can be harvested. Alternatively, a rotor of a generator may be clutch-driven according to the rotation of the turbine 20 and/or shaft 40. Embodiments of system 10 employ multiple generators 30 optimized for the detected and collected wind speed. (See FIG. 4B, FIG. 4C, and FIG. 9).

In one embodiment, the mechanical power (e.g., rotation of the turbine 20 about the axis of rotation) generated by the conversion of the kinetic energy of a moving fluid (e.g., wind) is converted to electrical power by an alternator/generator 30 or a dynamo. For example, the rotating shaft 40 or revolving turbines 20 of the wind conversion system 10 may transfer the mechanical power via gears 32, pulleys, rollers, belts, magnets, or other means to an alternator/generator 30 or dynamo. When a rotating armature or rotor 34 of the alternator/generator 30 moves, magnets move past wire coils (or a wire moves past a magnet) and the resulting magnetic fields push electrons through the coil generating electricity to be harvested.

The magnetic field can be produced by either permanent magnets or electromagnets. Exemplary suitable permanent magnets include neodymium-iron-boron (NdFeB) magnets, Samarium cobalt magnets, hard ferrite (ceramic) magnets, fabricated magnets, polymer bonded magnets, alnico (aluminum, nickel, cobalt) family of magnets, and the like.

Figure 4A:
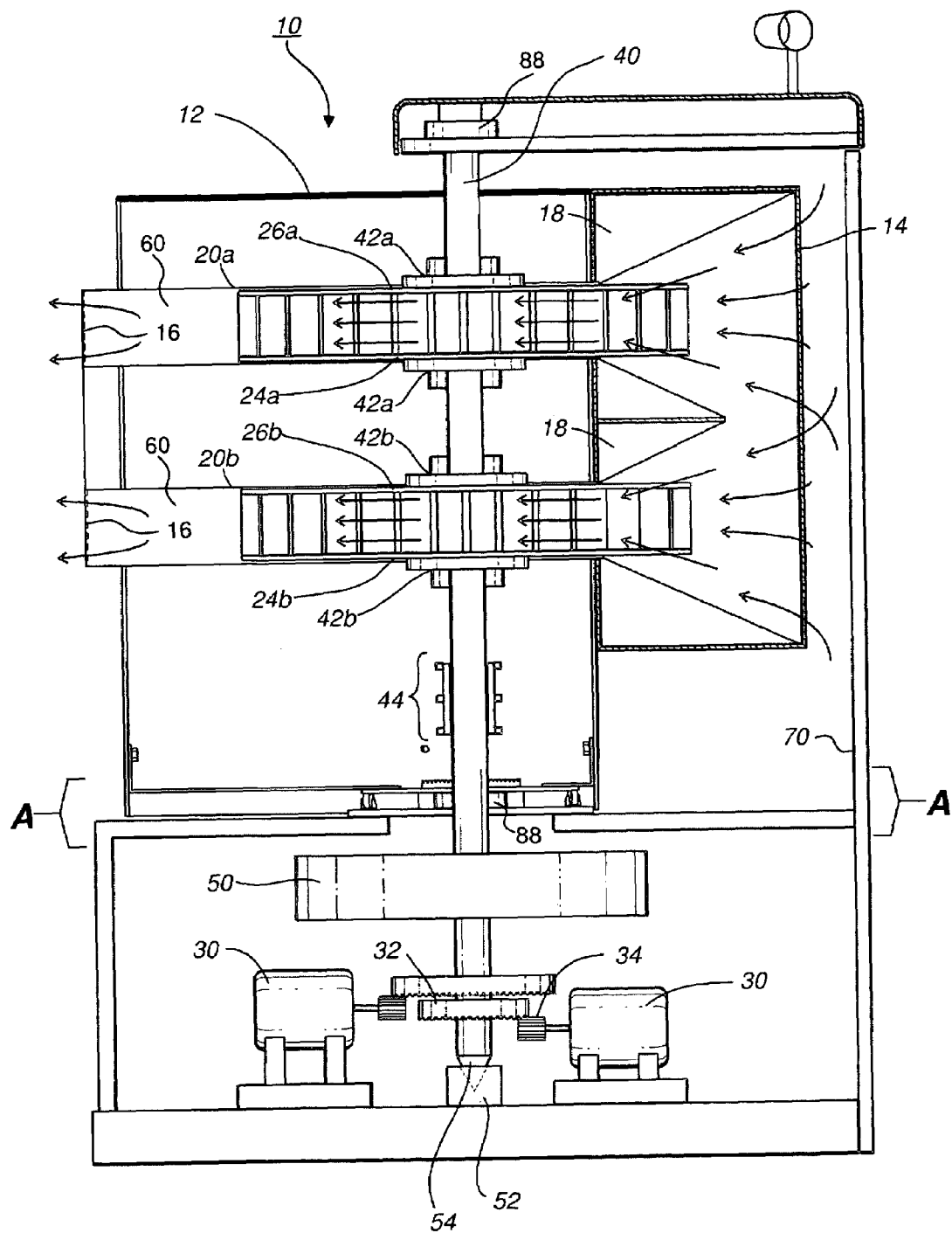
FIG. 4A is a cross-sectional side view of a rotating shaft vertical axis wind turbine embodiment of a Wind Energy Conversion Chamber system according to the present invention.
Figure 4B:
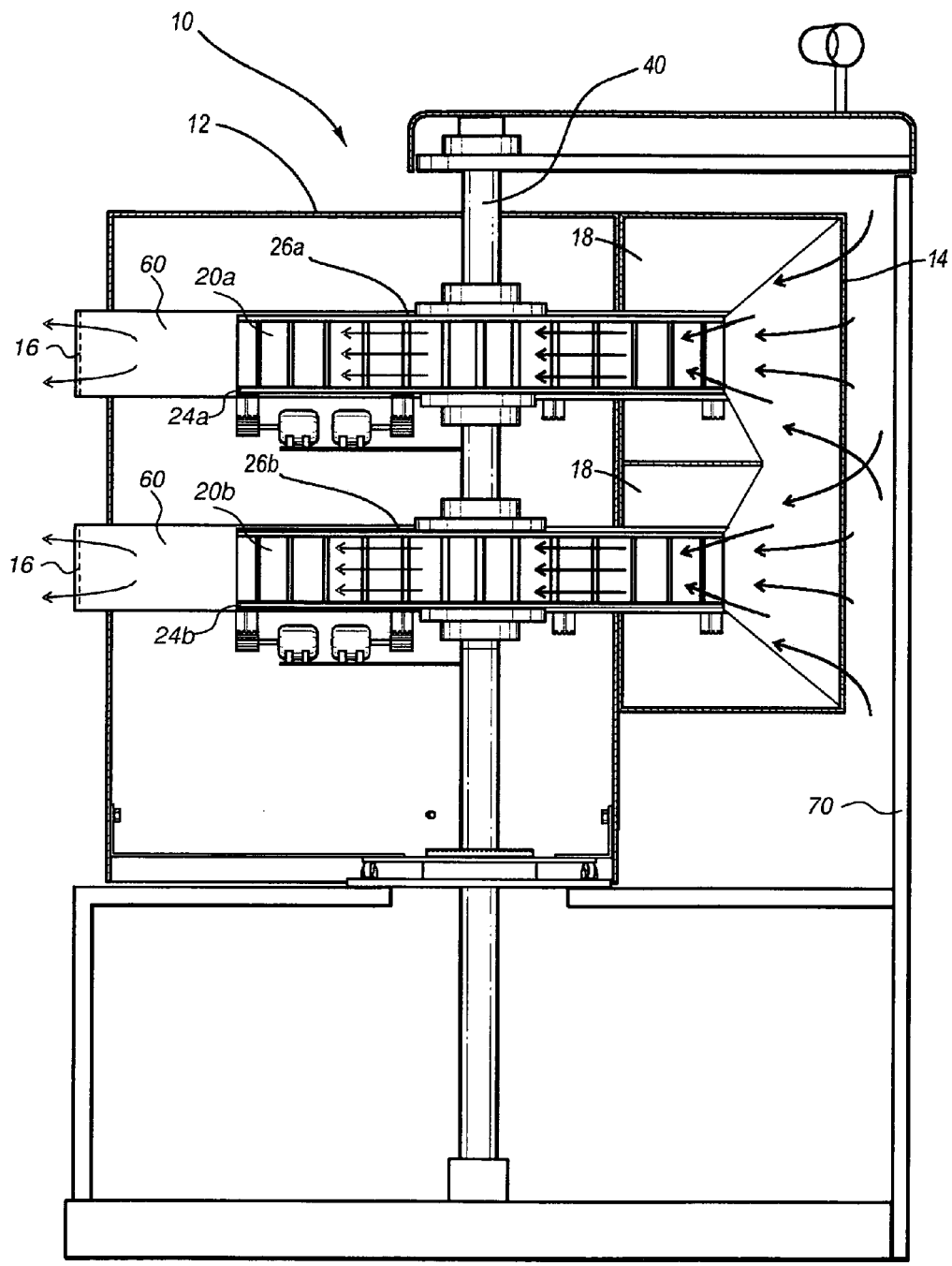
FIG. 4B is a cross-sectional side view of a fixed shaft vertical axis wind turbine according to an embodiment of the present invention.
Figure 4C:
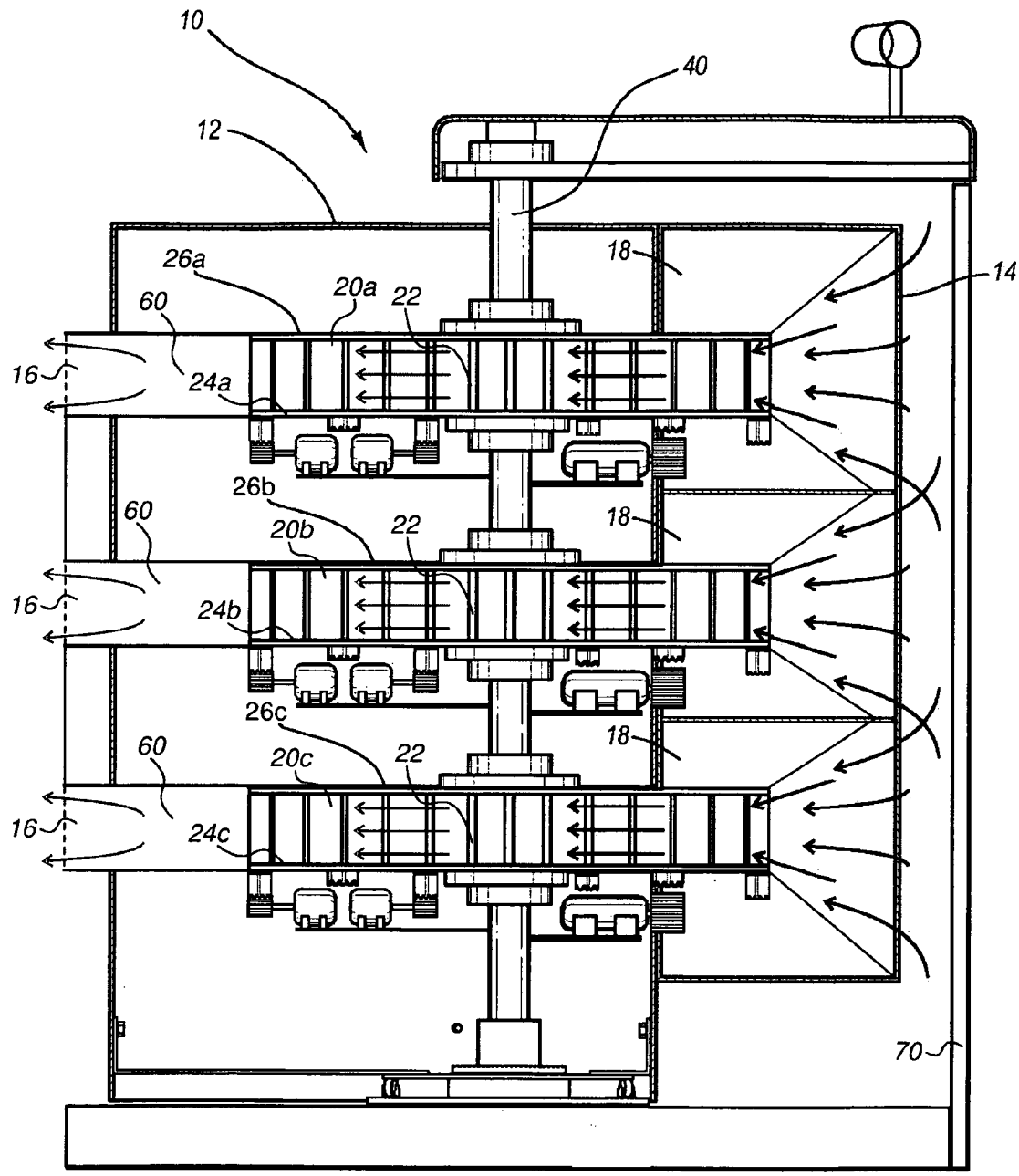
FIG. 4C is a cross-sectional side view of a fixed shaft vertical axis wind turbine with multiple speed energy converters according to an embodiment of the present invention.
Figure 4D:
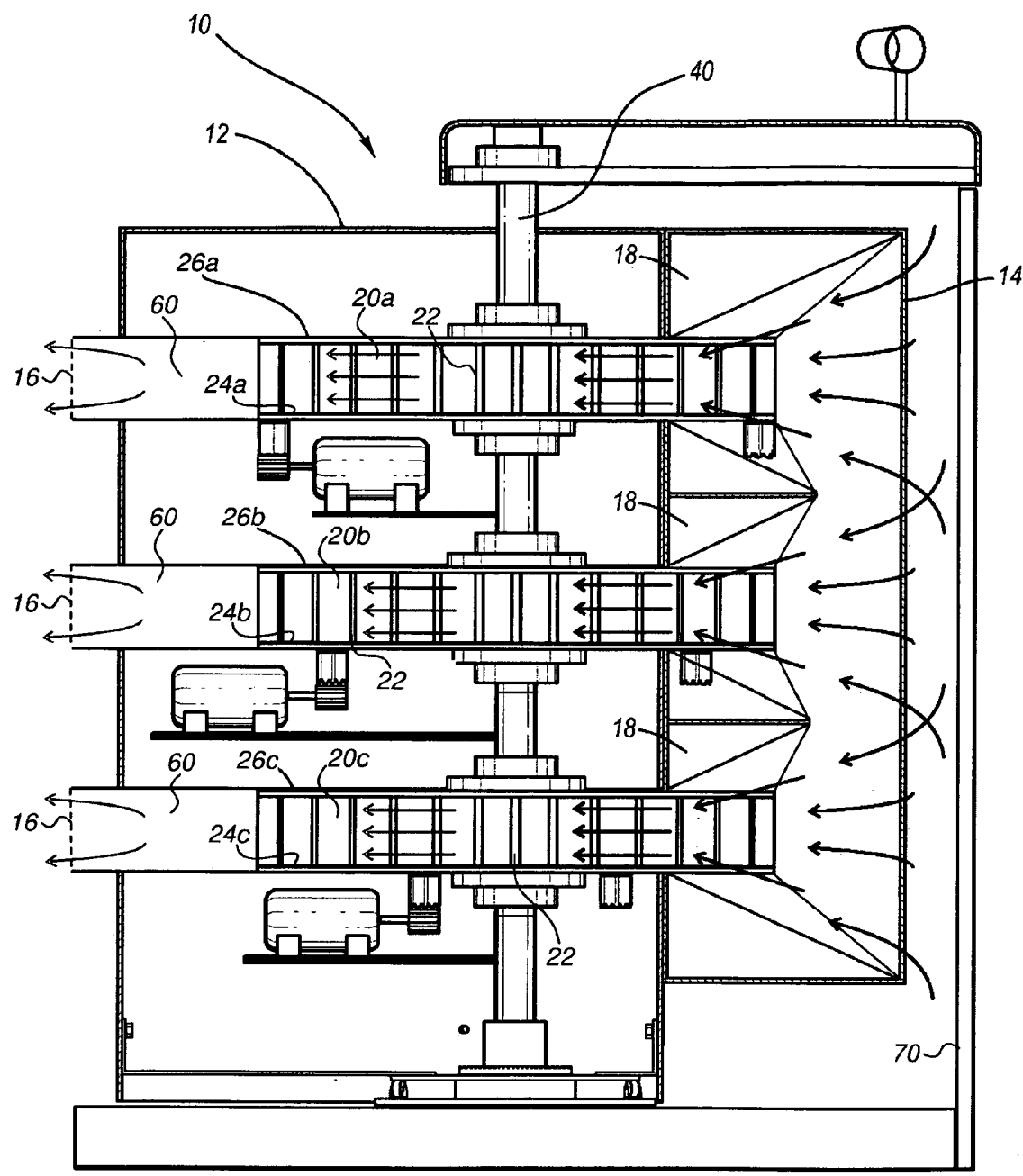
FIG. 4D is a cross-sectional side view of a fixed shaft vertical axis wind turbine with variable speed converters according to an embodiment of the present invention.

In one embodiment, the shaft 40 provides support, but does not rotate (see FIGS. 4B–4D). As indicated previously, the turbines 20 in the fixed shaft design may transfer the mechanical power via gears, pulleys, rollers, belts, magnets, or other means to an alternator/generator 30 or dynamo of the wind generator.

In addition to providing a protective covering for the turbines 20, the revolving housing 12 is also configured to act as a wind barrier or wind shield to prevent wind currents from negatively interfering with rotation of the turbine 20. While turbines 20 are typically designed to rotate in a single direction, in unprotected designs the wind blows onto both the receiving blades and the blades on the opposite side of the exposed turbine. As a result, the blades are generally designed to receive the wind on one side and to deflect the wind on the other. Unfortunately, even the deflection of wind by the turbine involves some resistance and steals potential energy from the turbine's rotation. As the theoretical maximum power efficiency of an ideal windmill is only 59.3% according to the Betz Coefficient, every little improvement or reduction in friction/resistance helps. The revolving housing 12 prevents conflicting wind currents from adversely affecting the turbine.

The illustrated revolving housing 12 shields the turbine 20 and allows the turbine designer to focus on providing an efficient unidirectional turbine design for the turbine. The illustrated system 10 uses a two-stage energy conversion from wind to rotational energy to electricity. Other embodiments could simply us a single stage conversion from wind to mechanical energy.

In one embodiment, the convex shape of the revolving housing 12 helps to channel additional air towards the intake of the chamber. In FIG. 1 and FIG. 2 this is illustrated through the rounded convex nature of the revolving housing 12. However, other channeling designs might also be used, such as a concave or straight, without departing from the spirit and scope of the invention.

In one embodiment, the housing 12 also includes a protectively screened (16) exhaust 60 (See FIG. 2 and FIG. 3) that may be rotated to a substantially leeward position. This exhaust configuration may help reduce the turbulence associated with the system 10.

FIG. 3 is a plan view from above of an embodiment of a suitable operating environment for a wind energy conversion chamber system 10 according to the present invention. The support structure 70 concentrically positions the turbine 20 and the rotating shaft 40 about a yaw axis without interfering with the rotation of the housing 12. In one embodiment, the housing 12 may rotate 360° or the entire arc of the circle. Other embodiments may use more limited ranges of motion based on the application and environment. For example, one embodiment permanently fixes the position of the inlet 14.

The housing 12 rotates about the axis of the turbine 20. As such the inlet 14 moves in a circular path concentric with the axis of the turbine 20 and shaft 40. Other support structures may be used without departing from the spirit or significant characteristics of the described and illustrated support structure. More specifically, the support structure should provide the system 10 with the range of rotation required for the environment and/or application. As such, the described embodiments of support structure 70 are to be considered in all respects only as illustrative and not restrictive.

FIG. 4A illustrates another suitable operating environment of a wind energy conversion system 10. More specifically, FIG. 4A is a cross-sectional side view of a vertical axis wind turbine embodiment of the system 10. The system 10 further includes coupler 44 on shaft 40 to better facilitate maintenance.

FIG. 4A illustrates airflow from the inlet 14 through the concentrating channel 18 to the blade chord of the turbine 20. Each turbine 20 has a plurality of blades, a top turbine plate 26, and bottom turbine plate 24. Each turbine 20 partially intruding into a respective one of the multiple conduits of the concentrating channel 18 and positions the plurality of blades substantially normal to the flow of the concentrated wind. The turbines 20 are each mounted within the wind chamber to position at least a portion of the plurality of blades within a plenum created in the concentrating channel 18.

FIG. 4A illustrates a mechanical energy transfer mechanism including multiple gears 32. Each gear is operatively coupled to an armature/rotor 34 associated with a dynamo or generator 30. Embodiments of the system 10 may use at least one of gears, pulleys, rollers, belts, magnets, and/or other means as the mechanical energy transfer mechanism.

In one embodiment, the armature/rotor 34 may be selectively engaged or disengaged from the rotating gear 32 based on the rotational speed of the shaft 40. A clutch mechanism can also provide a means for preserving the generator 30 until a cut-in speed has been achieved. Moreover, if the shaft exceeds the operational thresholds of the respective generator 30, the clutch mechanism can withdraw the armature/rotor 34.

Figure 7:
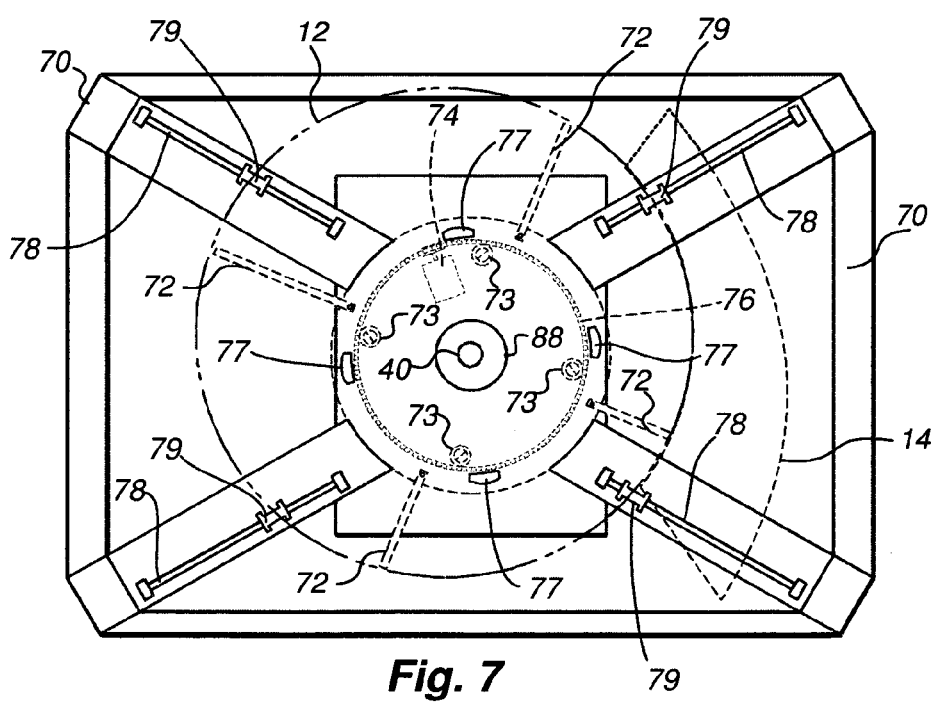
FIG. 7 is a cross-sectional plan view from above of the Wind Energy Conversion Chamber according to the present invention showing section cut A—A of FIG. 4A.

FIG. 4A also provides a side view of the rotational mechanism used to turn the housing 12 about the yaw axis of the axially aligned turbines 20, which should be considered in combination with the top cross-sectional view of FIG. 7.

The wind detection devices in FIG. 1 and FIGS. 4A–4D may also serve as an activation switch for the system 10. Specifically, when sufficient wind is detected, the system 10 is accordingly activated and, if necessary, begins the positional intake readjustment. Exemplary wind detection devices include mechanical and electronic anemometers, wind sails, windsocks, Sonic Detection and Ranging Devices (SODARs), and the like.

FIG. 4A also illustrates the interaction of the support structure 70 with the housing 12. The support structure 70 concentrically positions the rotating shaft 40 about a yaw axis without interfering with the rotation of the housing 12. In FIG. 2 and FIG. 4, the conduits of the concentrating channel 18 narrow to the size of the blade chord before the turbine 20 partially intrudes into a respective one of the multiple conduits from the housing 12. As such the edge of the housing 12 interfacing with the concentrating channel 18 travels a circular path concentric with the axis of the shaft 40.

In one embodiment the shaft 40 is lifted by the support structure so that the tip 54 "floats" on the lubricated support block 52. An embodiment hangs the shaft 40 using bearings to share the weight between the lubricated support block 52 and the support structure.

FIG. 4B is a cross-sectional side view of a fixed shaft vertical axis wind turbine according to an embodiment of the present invention. The axially aligned revolving turbines 20a and 20b of the wind conversion system 10 transfers the mechanical power of their rotation via concentrically arranged gear tracks on the turbines. Other transfer mechanisms include rollers, magnets, pulleys, belts, or other means.

As with FIG. 4A, the embodiment illustrated in FIG. 4B may have multiple generators engaged with the turbine at once, depending on the operating conditions. Specifically, additional generators may be connected when the turbines are rotating above a given operational threshold and removed when rotating below another given threshold for the device. In addition to adjusting the load on each turbine, the system 10 may also adjust the blades 22, the inlet 14, and/or the concentrating channel 18 to bring the device within given operational thresholds.

As the concentrating channel 18 generally divides the airflow into substantially equal portions, both turbines tend to rotate at substantially the same speed. As such, equally matched generators are generally positioned concentrically equidistant from the yaw axis of the turbine.

Moreover, the concentrating channel 18 narrows to the width of the blade chord, between the lower turbine plate 24 and the upper turbine plate 26, to focus the collected wind onto the turbine 20.

FIG. 4C is a cross-sectional side view of a fixed shaft vertical axis wind turbine with multiple speed energy converters according to an embodiment of the present invention. FIG. 4C illustrates the potential vertical expansion of the system 10 through the additional turbines 20a, 20b, and 20c. Moreover, the transfer mechanisms may employ a variety of modifications to enhance performance. For example, several gear tracks may be added to each turbine, the gear ration between rotor and turbine may be altered, size of generator may be changed, and the like.

FIG. 4C also illustrates the division of inlet 14 into distinct concentrating channels 18 each assigned to a separate turbine and narrowing the inlet 14 to the width of the blade chord.

FIG. 4D is a cross-sectional side view of a fixed shaft vertical axis wind turbine with variable speed converters according to an embodiment of the present invention. Although the majority of applications will result in a substantially equal division of collected wind between the turbines, in one embodiment, each vertical level is subjected to different wind strength and therefore connects to the turbine at different locations along the turbine to optimize performance according to environment. The stronger winds having transfer mechanisms, such as a gear track, positioned to produce peak performance. FIG. 4D also illustrates an alternative concentrating channel design, which narrows the channel for the collected air to substantially the width of the upper turbine plate 26 to the lower turbine plate 24.

Figure 5:
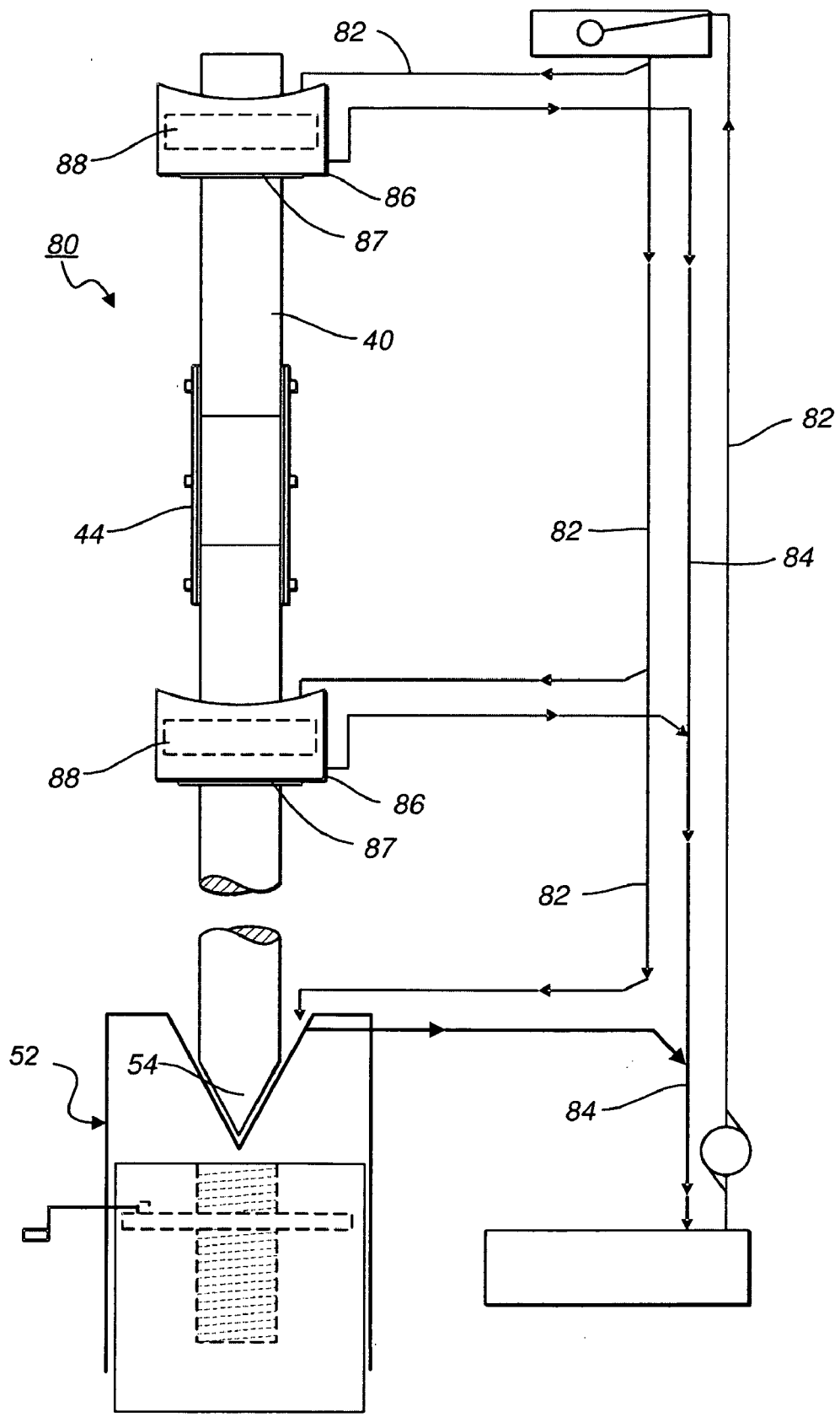
FIG. 5 is a fragmentary block diagram from a side of a bearing lubrication and friction reduction system according to one embodiment according to the present invention.

FIG. 5 is a fragmentary block diagram from a side of a bearing lubrication and friction reduction system 80 according to one embodiment according to the present invention. The frictional forces that resist the rotation of the turbines 20 and/or shaft 40 are greatly reduced through the use of a friction reduction system that may include bearing lubrication and an extensive lubrication system 80. The lubrication system 80 includes fill lines 82, drain lines 84, a plurality of lubricant pans 86, seals 87, and bearings 88 associated with each hub assembly 42. The lubrication system 80 may also include a top lubricant reserve with float switch, a drainage reserve with a pump coupled to the top lubricant reserve.

In one embodiment, the lubricated support block 52 also receives lubricant from fill lines 82 and removes lubricant via drain lines 84. In one embodiment, at least the fill lines 82 of the lubrication system 80 are pressurized. Alternatively, the continuous-flow coolant lubricant of the illustrated lubrication system 80 could be replaced with viscous lubricant, such as grease.

In one embodiment, the lubricated support block 52 is adjustable. This allows the support block to be moved up as the tip of the shaft wears away over time due to friction. The support block 52 may also be lowered to perform maintenance on the shaft 40. As previously introduced, coupler 44 allows portions of the shaft 40 to be removed for maintenance. In one embodiment, the tip of the shaft is replaced with a larger chamfer or rounding.

Figure 6:
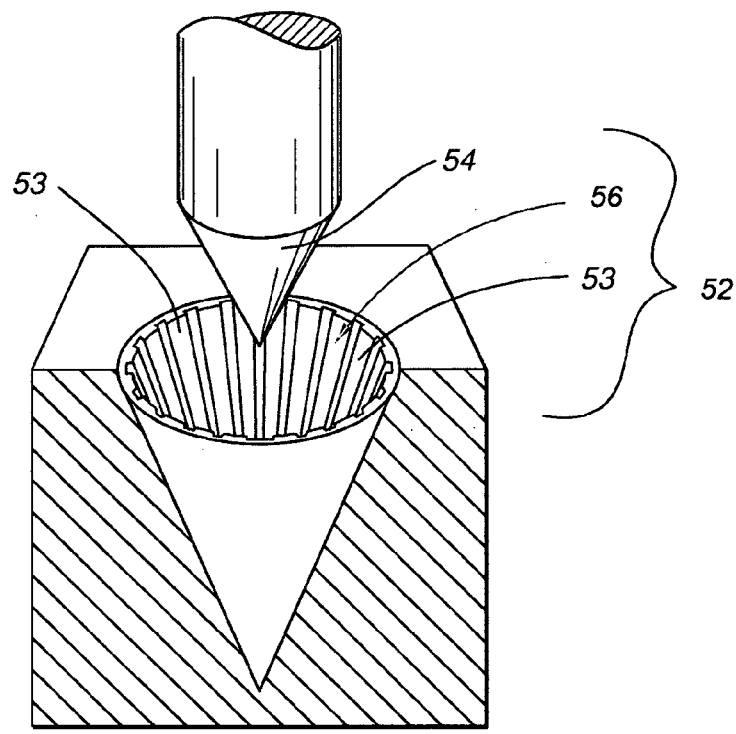
FIG. 6 is a fragmentary exploded perspective and partially broken away side view of the conical shaft and base bearing according to the present invention.

FIG. 6 is a fragmentary exploded perspective and partially broken away side view of the conical shaft tip 54 and the lubricated support block 52 according to the present invention. As previously indicated the friction reduction system includes a lubricated support block 52 to receive a conical shaped tip 54 on the shaft 40. Grooves 53 enable the lubricant to be equally delivered to the base bearing 56 without requiring pressurization. However, one embodiment pressurizes the lubricant so that the tip floats in the base bearing.

FIG. 7 is a cross-sectional plan view from above of the wind energy conversion system 10 according to the present invention showing section cut A—A of FIG. 4A. More specifically, FIG. 7 illustrates an embodiment of the revolution mechanism of system 10 to facilitate the repositioning of the intake and the housing (shown in outline only). The revolution mechanism includes motor 74 to turn the housing 12. The motor 74 interfaces with a circular gear track on a flange gear 76, the flange gear being concentric with the yaw axis of shaft 40 and revolving on supporting wheels 77. The gear track maintains its concentric position relative to the yaw axis of the shaft via roller pins 73 positioned on the inside of the gear track. The flange gear 76 is coupled via support spokes 72 to housing 12. In one embodiment, supporting wheels 77, roller pins 73, rotating motor 74, support brackets 78, slide rollers 79 and the shaft bearing 88 are secured to the support structure 70.

The lower edge of the housing 12 rests in slide rollers 79 on support brackets 78. The slide rollers 79 are slidably attached to support brackets 78 and allow the edge of housing 12 to pass through while sliding in or out on the support brackets 78. In one embodiment, the support bracket 78 is rod shaped, passes through the slide roller 79, and is configured to function as an axle for the slide roller 79 which rotates about the support bracket 78. During intake readjustment, when the edge of the housing 12 positioned above each support bracket 78 moves in or out relative to the center of the shaft 40, the respective slide roller 79 on the support bracket 78 moves concurrently in or out along the support bracket 78.

Figure 8:
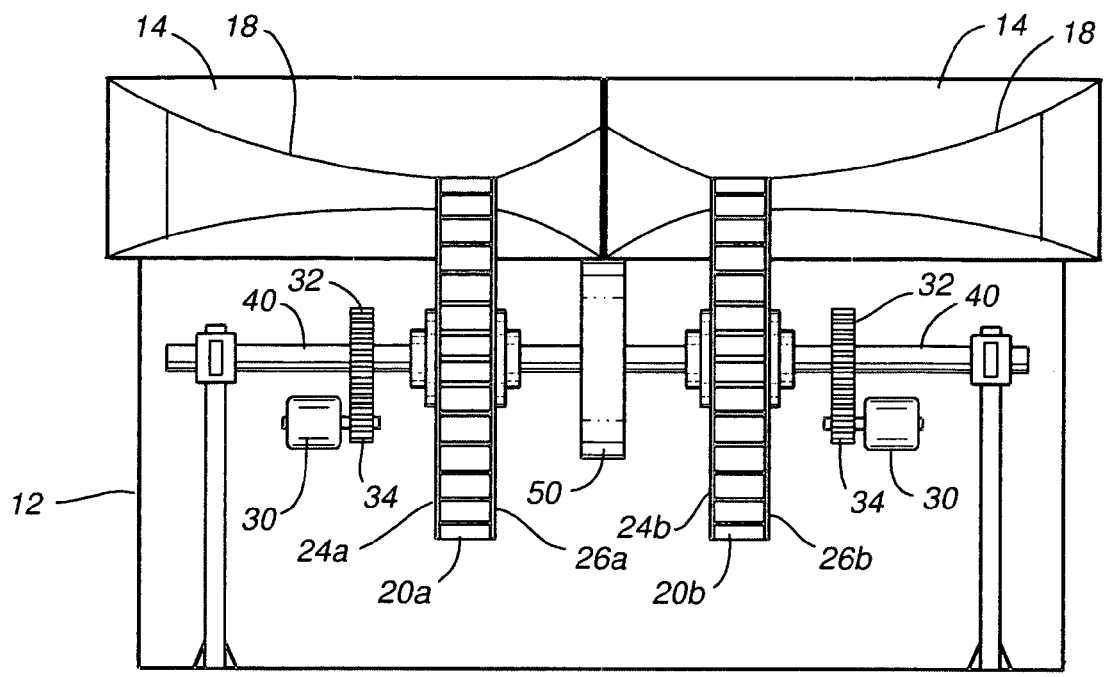
FIG. 8 is a cross-sectional side view of a horizontal axis wind turbine embodiment of a Wind Energy Conversion Chamber system according to the present invention.

FIG. 8 is a cross-sectional side view of a horizontal axis wind turbine according to an embodiment of the present invention. A Horizontal Axis Wind Turbine (HAWT) is designed so that the axis of the rotating turbine or shaft of the wind turbine is parallel to the ground. The horizontal axis wind turbine configuration is useful in environments where the wind is predominately collected from a single direction. Exemplary operational environments include a moving vehicle, a shoreline, a mountain ridge, or a building.

The horizontal axis wind turbine includes multiple turbines 20, gears 32, and flywheel 50 axially aligned and concentrically arranged along shaft 40. As with the previously described vertical axis wind turbine, the horizontal axis wind turbine also includes at least one generator 30 coupled to each gear 32 via armature/rotor 34. Moreover, the inlets 14 are each coupled to concentrating channels 18, which narrow to about the size of the blade chord of the turbine 20.

Figure 9:
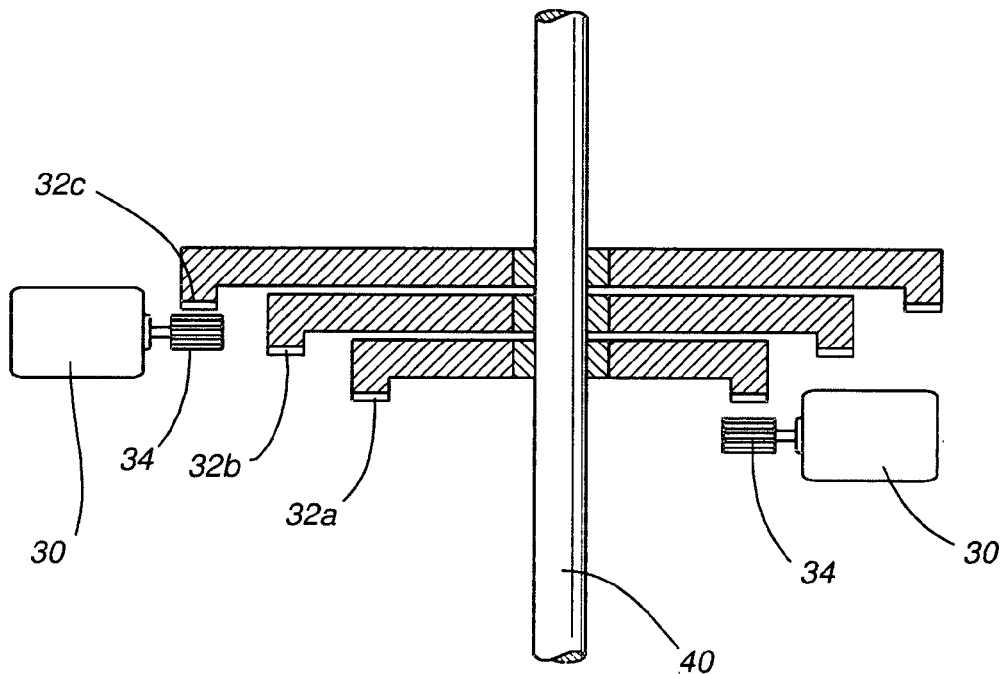
FIG. 9 is a fragmentary, cross-sectional side view of the variable speed transfer mechanism according to one embodiment of the present invention.

FIG. 9 is a fragmentary, cross-sectional side view of a variable speed transfer mechanism according to an embodiment of the present invention. A mechanical energy transfer mechanism includes multiple gears 32a, 32b, and 32c. At least one generator 30 is coupled to each gear 32 via armature/rotor 34. The transfer mechanism may include a clutch mechanism to engage and disengage the rotors 34 to the gears 32 based in part on the operational thresholds of the system 10. More specifically, if the shaft 40 is spinning too fast a more powerful generator may be applied. Alternatively, one embodiment enables the use of multiple generators to a single shaft.

The transfer mechanism also attempts to prevent freewheeling; a condition created when a wind generator is not connected to a load and is thereby in danger of self-destruction from overspeeding.

Figure 10A:
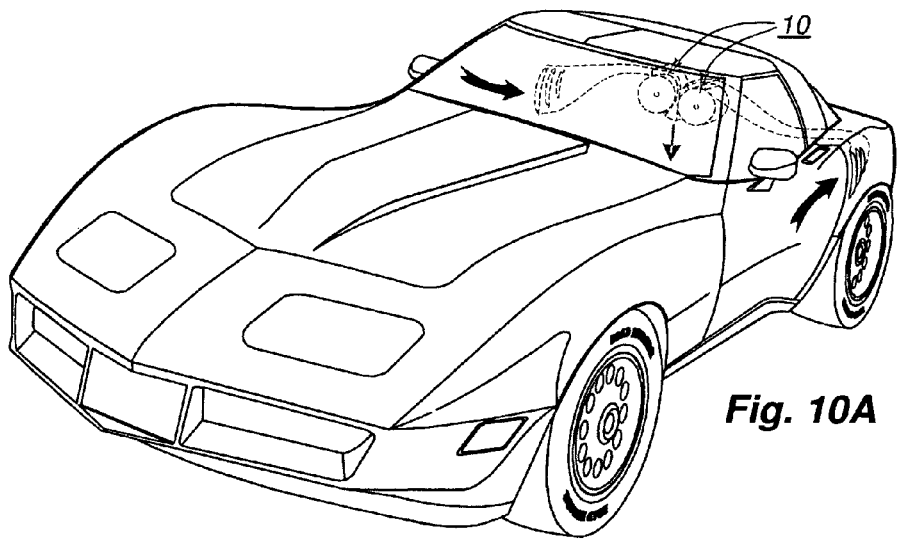
FIGS. 10A–10E are perspective views of suitable operating environments for vehicular systems using embodiments according to the present invention.
Figure 10B:
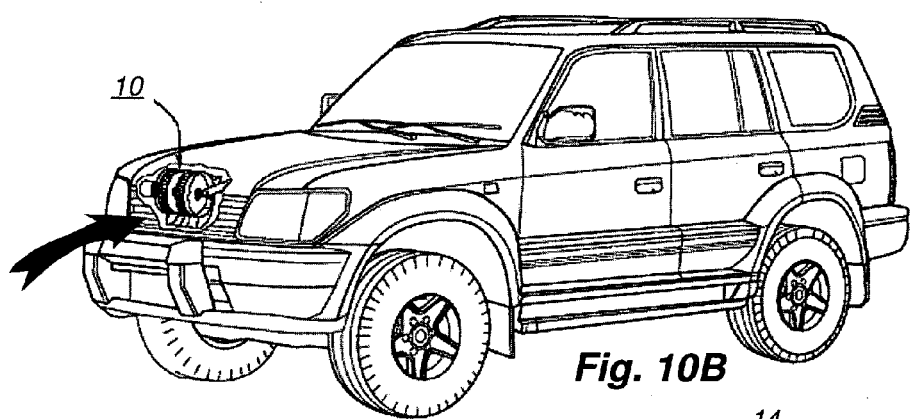
Figure 10C:
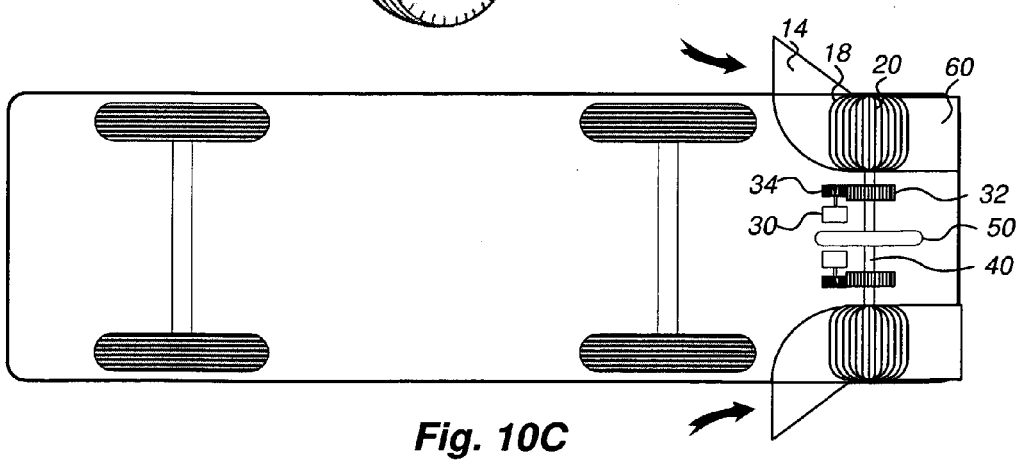

FIG. 10A and FIG. 10B are perspective views of suitable operating environments for vehicular wind energy conversion systems. FIG. 10A illustrates a side venting system with an exhaust to the rear or bottom of the vehicle. The side venting system may also be replaced with a top or bottom venting system. Accordingly, the conversion system may employ either a vertical axis wind turbine (VAWT) or horizontal axis wind turbine (HAWT) configuration. Moreover, the systems illustrated in FIG. 10A and FIG. 10B demonstrate that the shaft may be positioned parallel or perpendicular to the rear wheel axle on the vehicle. FIG. 10C provides a top view of an embodiment of a side venting system with a shaft parallel to the car axle. In one embodiment, the side vents are adjustable between an open and a closed position, such that the vents are closed when the car is not in motion and open when sufficient airflow has been detected.

Figure 10D:
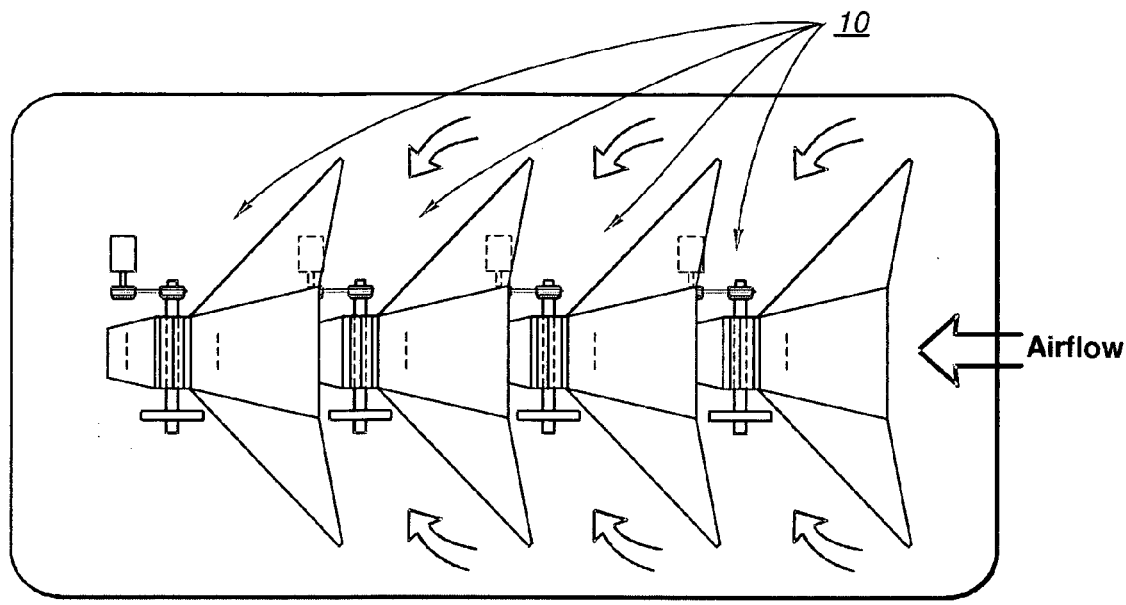
Figure 10E:
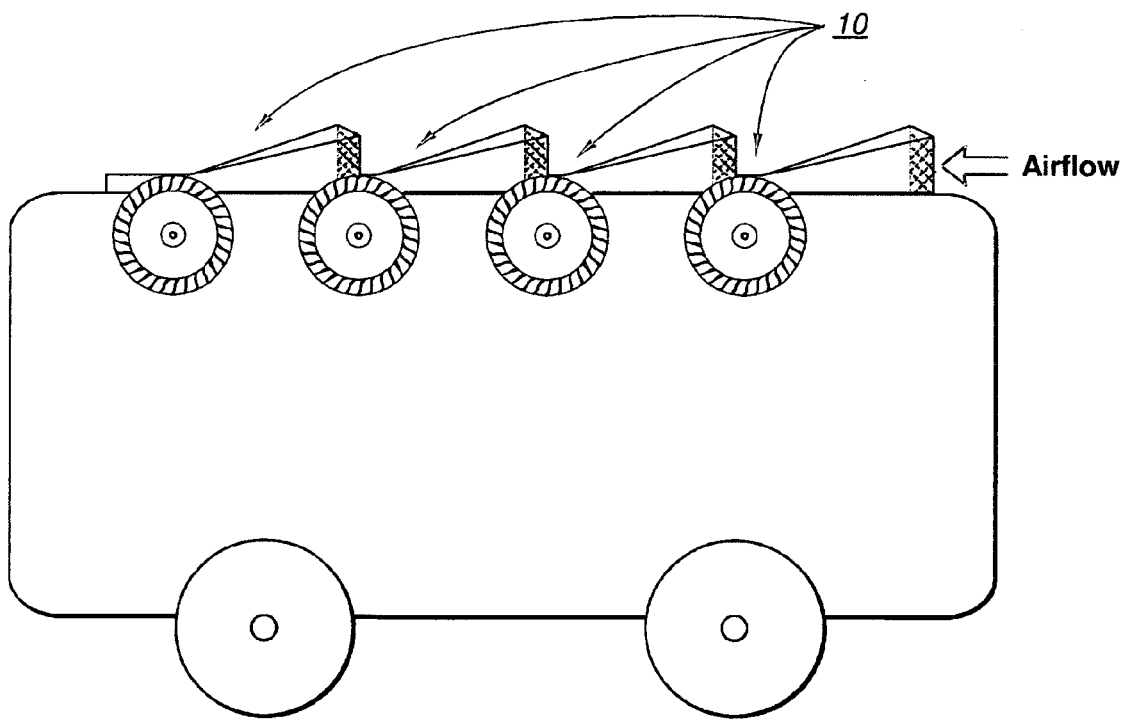

An embodiment using a protected top venting system in a wind supplemented transportation system is illustrated in more detail in FIG. 10D and FIG. 10E of an embodiment according to the present invention. It is anticipated that variations of the protective top venting configuration could also be used in association with trucks, trains, buses, airplanes, and the like. For example a refrigeration truck could supplement its power from wind energy collected from vents on the trailer. Electric busses could recharge batteries and trains could collect power to run lights.

Figures 11A, 11B, 12:
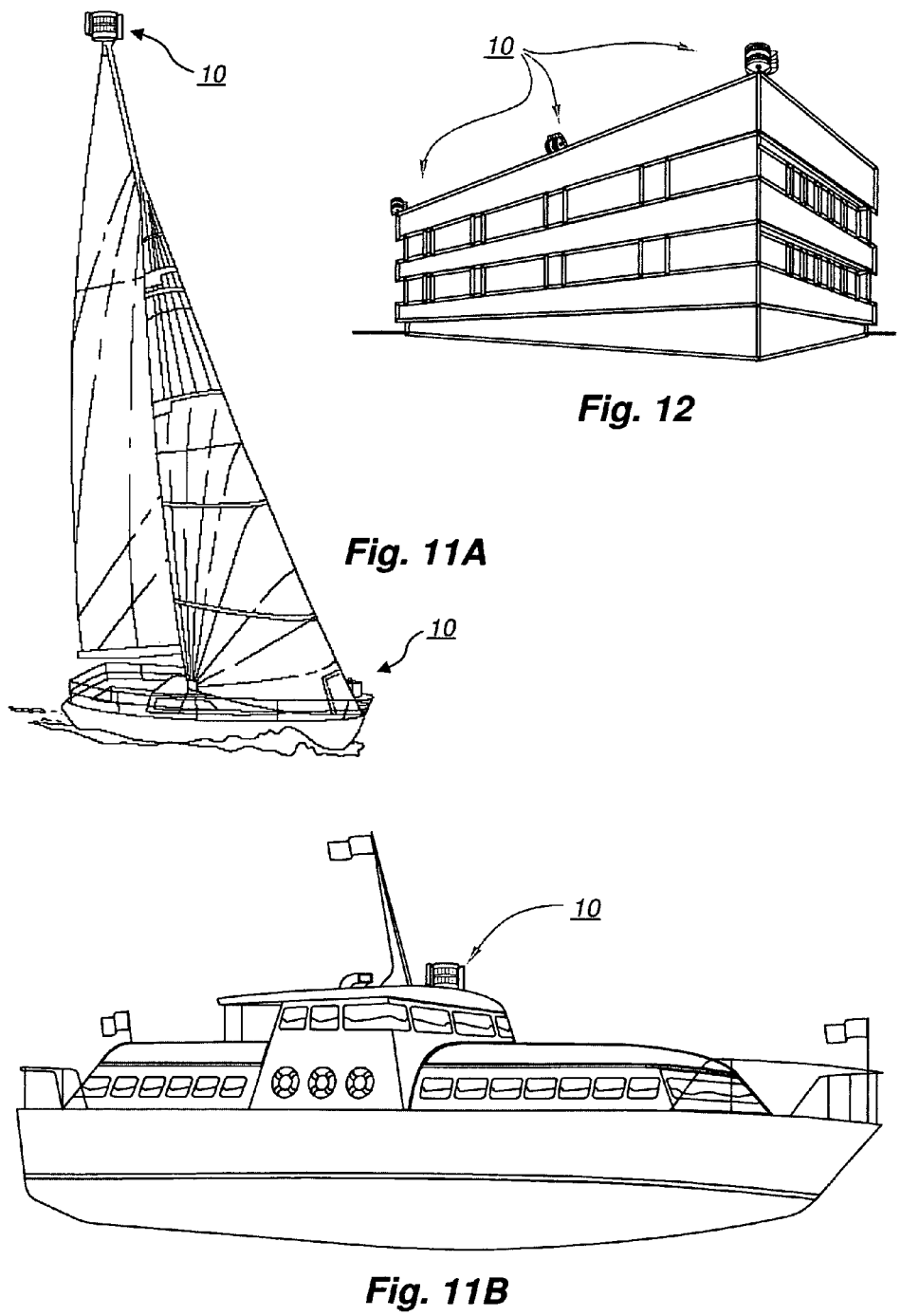
FIG. 11A and FIG. 11B are perspective views of suitable operating environments for nautical systems using an embodiment according to the present invention.
FIG. 12 is a perspective view of a suitable operating environment for a structural system using an embodiment according to the invention.

FIG. 11A and FIG. 11B are perspective views of suitable operating environments for various nautical systems using embodiments according to the present invention. Specifically, in FIG. 11A a VAWT conversion system 10 is positioned at the bow of the boat. In the yacht illustrated in FIG. 11B, the VAWT conversion system 10 is placed above the captain's cabin on the top deck. In addition, other configurations are also possible for example; the conversion system 10 may also be positioned atop a mast of a sailing vessel as illustrated in FIG. 11A or in the superstructure atop a cruise ship near one of its funnels or stacks.

FIG. 12 is a perspective view of a suitable operating environment for a structural system using an embodiment according to the invention. Specifically, three conversion systems 10 are placed along the edge of a building. The units placed in the corners of the building are enabled for rotational range of at least 270° and are VAWT. The unit in the center illustrates a HAWT similar to the embodiment previously illustrated in FIG. 8.

In one embodiment, the wind energy conversion system 10 is a freestanding multi-story building structure. This larger embodiment may be useful in commercial wind farm generation projects.

Figure 13:
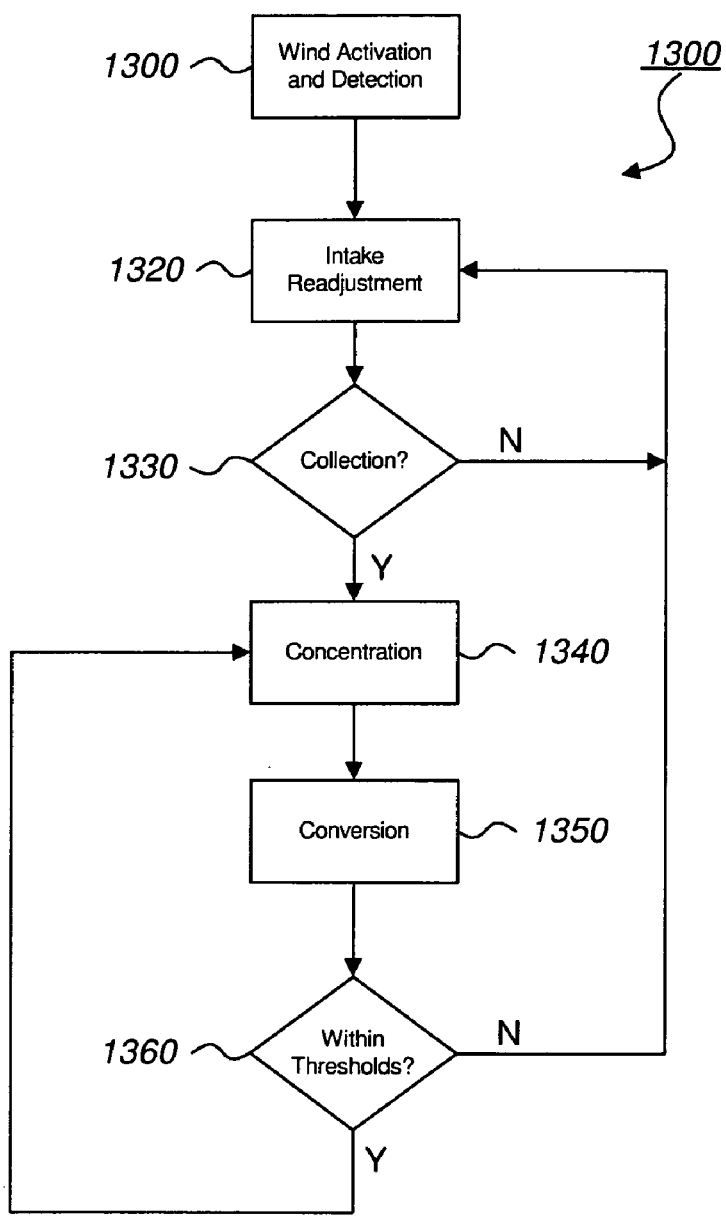
FIG. 13 is a flowchart of the wind energy conversion process according to the invention.

Turning now to FIG. 13, particular methods of various embodiments are described in terms of operational mechanisms with reference to a flowchart. The methods to be performed by a wind energy conversion device constitute operational programs performed by mechanical devices or computer-controlled machines. Describing the operational methods of the wind energy conversion chamber by reference to a flowchart enables one skilled in the art to develop such operational programs including such instructions to carry out the methods on suitably configured control devices (the rotating mechanism of the chamber housing and/or clutch mechanism associated with the generators).

The steps may be monitored and performed in a computer controlled device or may be embodied in a mechanical device. If written in a programming language conforming to a recognized standard, such instructions can be executed on a variety of hardware platforms and for interfaces to a variety of operating systems.

It will be appreciated that a variety of devices and methods may be used to implement the control system for a protective wind energy conversion chamber as described herein. Furthermore, it is common in the art to speak of flowchart steps, in one form or another (e.g., program, procedure, process, application . . . ), as taking an action or causing a result. Such expressions are merely a shorthand way of saying that execution of the step by a device causes the control system of the protective wind energy conversion chamber to perform an action or a produce a result.

FIG. 13 is a flowchart that illustrates one embodiment of a wind energy conversion system 1300. Initially, the system 1300, upon detecting sufficient wind, is activated and thereby places the system 1300 into an activation and detection operational mode in block 1310. In the activation and detection mode, the wind energy conversion system 1300 detects wind and accordingly activates the positional intake readjustment in block 1320.

In one embodiment, the activation and detection mode in block 1310 also detects the strength of the wind gusts and selects an appropriate operational mode for the system 1300. Exemplary operational modes include high wind generation mode, variable gusts generation mode, steady state generation mode, low wind generation mode, no wind mode, evaluation mode, and demonstration/manual adjustment mode. Upon selecting an operational mode, the system 1300 generates or applies operational thresholds to assist the system 1300 in readjusting the intake in block 1320. These operational thresholds may also be useful for maintaining a consistent speed or rotation of the turbines, when required by an attached generator. Alternatively, the detection of variable wind gusts may activate a variable generator or conversion mechanism that is not dependent upon the maintenance of a constant rotational speed. In one embodiment, readjusting the intake includes repositioning the housing of the chamber such that the protectively covered intake is windward to receive the wind. The intake is thereby positioned substantially normal to a flow of ambient wind current. In one embodiment, intake readjustment in block 1320 includes rotating the protectively covered intake about a yaw axis of the plurality of wind turbines. In at least one embodiment, the yaw axis coincides with the axis of the shaft.

Moreover, in one embodiment intake readjustment in block 1320 also includes exhaust readjustment, such that the protectively covered exhaust is positioned to release wind in a substantially leeward direction. This release can reduce the area of turbulence on the leeward side of the system 1300. The repositioned exhaust may also further increase the stability of wind currents around the system 1300 by redirecting "swirling gusts" outside of intake and exhaust areas.

Once the system 1300 is appropriately readjusted in block 1320, the system 1300 provides the status of collection in block 1330. If the system 1300 is not collecting wind at the anticipated level for the detected wind current, the system 1300 returns to block 1320 for additional optimization and readjustment. If collection of the wind is determined to be within the desired thresholds and/or levels in block 1330, then the system 1300 proceeds to concentrate the collected wind in block 1340.

Concentration of the collected wind in block 1340 may be accomplished in a variety of ways. In one embodiment, the protectively covered intake directs the wind into a channel having multiple conduits. Each conduit includes an inlet and an outlet. The area of the inlet opening being greater than the outlet opening. Thus, by reducing the available area within the conduits the wind is concentrated. Other embodiments include the strategic introduction of heat to further increase the concentration of the collected wind.

From the concentration block 1340, the system 1300 may begin conversion of wind to energy in block 1350. In one embodiment, the kinetic energy of a moving fluid (e.g., wind) is converted to mechanical power by the impulse or reaction of the fluid with the turbine. For example, upon receiving a gust of ambient wind current impinging on the blades of a turbine, the turbine turns about an axis positioned normal to the ambient wind current. In one embodiment, the turbine may include a series of fins, paddles, or blades arrayed about the circumference of a wheel or cylinder. In one embodiment, the wind generator is configured to produce electricity.

In Query block 1360 a decision is made concerning whether the conversion process is performing or operating within thresholds. Exemplary operational thresholds include collected wind speed, intake direction, available wind speed, available conversion mechanisms, efficiency of conversion, concentration ratios, efficiency of concentration, ambient wind temperature, vertical variance of available/collected wind and combinations thereof. If it is determined that the system 1300 is operating outside of given thresholds and requires additional adjustment, the modification is conducted in block 1320. The modification may include shifting generation gears, rotating the intake position, adjusting the level of concentration, elevation activation/deactivation of wind turbines, and other performance examinations. Other adjustments and/or thresholds may be added to the system 1300 in conjunction with the evaluation of operational conditions and overall performance. In this manner, the protective wind energy conversion device can be customized to the needs and interests of the operator.

For example, in another embodiment, the system 1300 operates in an evaluation mode to determine the optimal operation settings for the environment originally detected in block 1310. For example, the system 1300 configuration previously described above could be modified into an evaluation tool by adding a running clock to the device and monitoring the electrical output of the chamber over a measured period. A preset time could be determined in order for the device to operate at various settings and to select the preferred operation settings for the monitored environment. Upon completing an evaluation of all reasonable settings for the given thresholds, the system 1300 could return to the activation and detection mode and use the collected data to select future operational modes.

In one embodiment, the protective wind energy conversion chamber operates in a generation mode. In this mode, the protective wind energy conversion chamber can locate the available wind and adjust the intake and internal components to optimize generation under the detected conditions. Exemplary generation modes include high wind generation mode, variable gusts generation mode, steady state generation mode, and low wind generation mode. A no wind mode may also be detected, but is not typically considered to be a generation mode. The system allows adjustments based in part on the operational thresholds and on the available environmental conditions.

A variety of different methods, in addition to those previously described mechanisms, may be used for converting the wind. For example, FIG. 4B, FIG. 4C, and FIG. 4D provide an illustration of a cross-sectional side view of various fixed shaft vertical axis wind turbine configurations according to embodiments of the invention. Specifically, the generators are supported by the stationary shaft and are directly coupled to the turbines through a transfer mechanism, such as a gear or roller, and are thereby individually actuated by the wind. FIG. 4B, FIG. 4C, and FIG. 4D also illustrate methods of varying the generated output, by increasing or decreasing the radius of the gear or roller track on the turbine. The configuration in FIG. 4D may be useful in environments where there is a sizable difference in wind strength according to the vertical position of the intake.

The present invention may be embodied in other specific forms without departing from its spirit or significant characteristics. The described embodiments are to be considered in all respects only as illustrative and not restrictive. Therefore, the scope of the invention is indicated by the appended claims rather than by the foregoing description. All changes that come within the meaning and range of equivalency of the claims are to be embraced within their scope.

What is claimed is:

1. A method for converting wind energy from an ambient wind current, the method comprising:
   rotating a housing for positioning a protectively covered intake windward, the intake being substantially normal to a flow of the ambient wind current to receive the wind;
   collecting the wind into a channel having multiple conduits, the channel dividing the collected wind into the multiple conduits, each conduit having an inlet and an outlet;
   concentrating the collected wind in each of the multiple conduits;
   converting the concentrated wind into energy via multiple turbines, each turbine partially intruding into a respective one of the multiple conduits and havingblades positioned substantially normal to the flow of the concentrated wind, each turbine having an axis being stationary relative to said housing; and
   directing the concentrated wind to a protectively covered exhaust to release the concentrated wind in a substantially leeward direction.

2. The method as recited in claim 1 wherein the multiple conduits are partitioned into substantially equal portions prior to concentrating the wind.

3. The method as recited in claim 1, wherein the positioning step includes rotating about a yaw axis the protectively covered intake to obtain an optimum flow of the ambient wind current.

4. The method as recited in claim 1, further comprising determining whether the step of conversion is within operating thresholds.

5. The method as recited in claim 4, further comprising repositioning the intake for optimal flow when operating outside of the operating thresholds.

6. The method as recited in claim 4, wherein the operating thresholds include several operating zones, each operating zone being associated with one gear.

7. The method as recited in claim 6, wherein upon determining that the conversion is operating within a specific operating zone shifting at least one generator to the associated gear.

8. The method as recited in claim 1, wherein each channel is divided into substantially equal concentrator conduits, each conduit being configured to direct and to separate the wind for a different turbine.

9. A wind energy conversion chamber comprising:
a wind chamber or housing rotating with an intake interface for receiving a gust of wind, a cavity formed within said wind chamber to allow passage of the received wind therethrough, and an exhaust interface for releasing the wind in a substantially leeward direction;
a converter having at least one turbine, the converter being partially shielded from the wind and being operatively coupled to interface with said cavity, said at least one turbine having a plurality of blades and being mounted within said wind chamber to position at least a portion of said plurality of blades within a plenum created in said cavity, a blade chord of said at least one turbine being substantially normal to the received wind from said intake interface, at least one turbine having an axis being stationary relative to said housing; and
protective screens covering the intake interface and the exhaust interface configured to allow gusts of wind to pass through while preventing foreign objects from entering the converter to impede the rotation of the turbine.

10. The wind energy conversion chamber according to claim 9, wherein the cavity includes a concentrator channel coupled to the intake interface for concentrating the received wind and generating said plenum, said concentrator channel having an inlet and an outlet.

11. The wind energy conversion chamber according to claim 10, wherein said converter is coupled to said outlet of said concentrator channel to convert the concentrated received wind into kinetic/mechanical/rotational energy.

12. The wind energy conversion chamber according to claim 10, wherein the concentrated wind at said outlet of the concentrator channel is at a pressure greater than that of the outside atmosphere.

13. The wind energy conversion chamber according to claim 10, wherein said converter further includes a shaft to transfer power from the turbine, the shaft is coupled to a hub of said at least one turbine via a thrust bearing.

14. The wind energy conversion chamber according to claim 9, wherein the converter includes a plurality of gear tracks, each gear track being associated with a specific operational threshold based in part on detected environmental conditions.

15. A system for generating power using wind, the system comprising:
at least one turbine oriented substantially perpendicular to a rotatable shaft and parallel to each other, each turbine having a plurality of balanced blades;
a divisible intake channel for collecting the wind, said divisible intake channel having at least one input and at least one output;
at least one concentrating channel coupled to said at least one output for concentrating the wind individually onto said at least one turbine;
an exhaust for releasing the wind;
at least one security covering to prevent animals from interfering with operation and rotation of said at least one turbine and to allow passage of wind through said at least one security covering, said at least one security covering protecting said at least one input of said divisible intake channel; and
a wind shield to divert a first portion of the wind into the divisible intake channel and a second portion of the wind around the system to prevent negative interference with the rotation of the at least one wind turbine.

16. The system according to claim 15, wherein the wind shield includes a solid cylindrical housing having slotted openings for each turbine, the housing substantially enclosing the turbines except for a portion of the turbine exposed to the concentrating channels.

17. The system according to claim 16 wherein the housing, upon actuation, rotates the divisible intake channel in a windward direction to receive the wind gust.

18. The method as recited in claim 1 which further comprises protecting the intake and the exhaust with respective screens allowing wind to pass through the screens but preventing foreign objects from passing through the screens.

19. The method as recited in claim 1 wherein the intake is larger than the exhaust.

20. A method for converting fluid energy from an ambient fluid current, the method comprising:
rotating a housing for positioning a protectively covered intake windward, the intake being substantially normal to a flow of the ambient fluid current to receive the fluid;
collecting the fluid into a channel having multiple conduits, the channel dividing the collected fluid into the multiple conduits, each conduit having an inlet and an outlet;
concentrating the collected fluid in each of the multiple conduits;
converting the concentrated fluid into energy via multiple turbines, each turbine partially intruding into a respective one of the multiple conduits and having blades positioned substantially normal to the flow of the concentrated fluid, each turbine having an axis being stationary relative to said housing; and
directing the concentrated fluid to a protectively covered exhaust to release the concentrated fluid in a substantially leeward direction.

21. A fluid energy conversion chamber comprising:
a fluid chamber or housing rotating an intake interface for receiving a flow of fluid, a cavity formed within said fluid chamber to allow passage of the received fluid therethrough, and an exhaust interface for releasing the fluid in a substantially leeward direction;
a converter having at least one turbine, the converter being partially shielded from the fluid and being operatively coupled to interface with said cavity, said at least one turbine having a plurality of blades and being mounted within said fluid chamber to position at least a portion of said plurality of blades within a plenum created in said cavity, a blade chord of said at least one turbine being substantially normal to the received fluid from said intake interface, at least one turbine having an axis being stationary relative to said housing; and
protective screens covering the intake interface and the exhaust interface configured to allow flows of fluid to pass through while preventing foreign objects from entering the converter to impede the rotation of the turbine.

22. The method as recited in claim 1, which further comprises rotating the housing with a motor activated by wind tracking.

23. The wind energy conversion chamber according to claim 9, which further comprises a motor activated by wind tracking for rotating said housing.

24. The method as recited in claim 20, which further comprises rotating the housing with a motor activated by wind tracking.

25. The fluid energy conversion chamber according to claim 21, which further comprises a motor activated by wind tracking for rotating said housing.

26. The method as recited in claim 1, which further comprises completely covering the blades from above and below with plates.

27. The wind energy conversion chamber according to claim 9, wherein said at least one turbine has plates completely covering said blades from above and below.

28. The method as recited in claim 20, which further comprises completely covering the blades from above and below with plates.

29. The fluid energy conversion chamber according to claim 21, wherein said at least one turbine has plates completely covering said blades from above and below.

30. The method as recited in claim 1, wherein the housing is eccentric and the blades protrude from part of the housing.

31. The wind energy conversion chamber according to claim 9, wherein said housing is eccentric and said blades protrude from part of said housing.

32. The method as recited in claim 20, wherein the housing is eccentric and the blades protrude from part of the housing.

33. The fluid energy conversion chamber according to claim 21, wherein said housing is eccentric and said blades protrude from part of said housing.

34. The wind energy conversion chamber according to claim 9, wherein said blade chord is not tapered.

35. The wind energy conversion chamber according to claim 9, wherein each of said plurality of blades have a tip and a root, said blade root having more pitch than said blade tip.

36. The wind energy conversion chamber according to claim 9, wherein said plurality of blades of said at least one turbine are twisted to enable easier startup and better high-speed performance.

37. A system for generating power using fluid, the system comprising:

- at least one turbine oriented substantially perpendicular to a rotatable shaft and parallel to each other, each turbine having a plurality of balanced blades;
- a divisible intake channel for collecting the fluid, said divisible intake channel having at least one input and at least one output;
- at least one concentrating channel coupled to said at least one output for concentrating the fluid individually onto said at least one turbine;
- an exhaust for releasing the fluid;
- at least one security covering to prevent animals from interfering with operation and rotation of said at least one turbine and to allow passage of fluid through said at least one security covering, said at least one security covering protecting said at least one input of said divisible intake channel; and a fluid shield to divert a first portion of the fluid into the divisible intake channel and a second portion of the fluid around the system to prevent negative interference with the rotation of the at least one fluid turbine.

* * * * *